United States Patent
Toensing et al.

(10) Patent No.: US 6,704,995 B2
(45) Date of Patent: Mar. 16, 2004

(54) METHOD FOR SWAGING A SUSPENSION ASSEMBLY TO AN ACTUATOR ARM OF AN ACTUATOR BLOCK

(75) Inventors: Eyvand Ernest Toensing, Savage, MN (US); Richard August Budde, Plymouth, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/008,931

(22) Filed: Nov. 9, 2001

(65) Prior Publication Data

US 2003/0115741 A1 Jun. 26, 2003

Related U.S. Application Data

(62) Division of application No. 08/946,957, filed on Oct. 8, 1997, now Pat. No. 6,389,684.
(60) Provisional application No. 60/045,820, filed on May 5, 1997.

(51) Int. Cl.⁷ .............................. G11B 21/16; G11B 5/48
(52) U.S. Cl. ................. 29/603.03; 29/757; 29/243.518; 29/465; 360/244.6; 360/244.5; 360/266.1; 360/265.7
(58) Field of Search ............................. 29/603.03, 757, 29/603.02, 603.04, 603.05, 603.19, 283.5, 243.518; 360/244.6, 244.5, 266.1, 265.7; 403/277, 280, 282, 274

(56) References Cited

U.S. PATENT DOCUMENTS

| | | | |
|---|---|---|---|
| 2,640,618 A | 6/1953 | Hale | 403/277 |
| 3,413,021 A | 11/1968 | Potts | |
| 4,991,045 A | 2/1991 | Oberg | |
| 5,012,367 A | 4/1991 | Toensing | |
| 5,062,018 A | 10/1991 | Yaeger | |
| 5,097,584 A | 3/1992 | Cain et al. | |
| 5,153,794 A | * 10/1992 | Hinlein | 360/244.6 |
| 5,259,689 A | 11/1993 | Arand et al. | 403/280 |
| 5,557,839 A | 9/1996 | Mastache et al. | 29/603.03 |
| 5,602,698 A | 2/1997 | Miyazaki et al. | 360/244.6 |
| 5,706,574 A | 1/1998 | Shimanuki | 29/603.04 |
| 5,717,545 A | 2/1998 | Brooks et al. | |
| 5,848,469 A | 12/1998 | O'Conner et al. | 403/277 |

FOREIGN PATENT DOCUMENTS

JP  6-259907  * 9/1994

* cited by examiner

Primary Examiner—A. Dexter Tugbang
(74) Attorney, Agent, or Firm—Westman, Champlin & Kelly, P.A.

(57) ABSTRACT

A method for swaging a suspension assembly to an actuator arm of a data storage device is disclosed. The method includes steps of inserting a deformable tubular stake into an aperture of an actuator arm and inserting an expandable swaging member into a channel of the tubular stake within the aperture of the actuator arm. Thereafter, the method includes the step of expanding the swaging member to deform the tubular stake to swage the tubular stake to the actuator arm of the data storage device.

16 Claims, 10 Drawing Sheets

METHOD FOR SWAGING A SUSPENSION ASSEMBLY TO AN ACTUATOR ARM OF AN ACTUATOR BLOCK

CROSS-REFERENCE TO RELATED APPLICATION

This application is a divisional application of U.S. application Ser. No. 08/946,757, filed Oct. 8, 1997 now U.S. Pat. No. 6,389,684 and entitled "SWAGING FLEXURES TO E-BLOCK ARMS" which claims priority to Provisional Application Serial No. 60/045,820, filed May 5, 1997 and entitled "SWAGING FLEXURES TO E-BLOCK ARMS".

FIELD OF THE INVENTION

The present invention relates to a disc drive storage system. In particular, the present invention relates to a swaging device for coupling a suspension system supporting a head gimbal assembly relative to an actuator arm.

BACKGROUND OF THE INVENTION

Disc drives are well-known in the industry. Disc drives are used to store digital information on rigid discs coated with a magnetizable material in a plurality of circular, concentric data tracks. Discs are mounted on a spindle motor which rotate the discs for operation. Information is read from or written to the disc surface via transducers carried on a slider supported relative to the disc surface via a suspension system.

The suspension assembly includes a load beam and a gimbal spring for supporting the slider. The slider is coupled to the gimbal spring at an upper surface of the slider. The gimbal spring is also coupled to the load beam. The lower surface of the slider defines an air bearing surface. Rotation of a disc via the spindle motor interacts with the air bearing surface of the slider to create a hydrodynamic lifting force to lift the slider to fly above the disc surface for reading information from and writing information to the disc surface. The gimbal spring supports the slider to allow the slider to pitch and roll relative to the disc surface for operation. The load beam supplies a preload force to counteract the hydrodynamic lifting force of the slider. The preload force supplied by the load beam and the hydrodynamic lifting force created by the air bearing surface and rotation of the disc define the fly characteristics of the slider (and transducers) above the disc surface.

The slider is positioned relative to various concentric data tracks via an actuator mechanism. The actuator mechanism typically includes an "E-block" assembly, which is rotationally coupled to a base of the disc drive to define a rotary-type actuator. The E-block includes a plurality of spaced actuator arms and is rotationally operated via an actuator drive under the control of electronic circuitry. In particular, the suspension assemblies supporting the sliders are coupled to actuator arms of an E-block in alignment with upper and lower surfaces of discs supported by the spindle motor.

The suspension assemblies are coupled to the actuator arms via a swaging technique. The suspension assemblies include a tubular-shaped stake having an opened central channel extending therethrough. The outer dimension of the stake is sized for insertion into a hole extending through an actuator arm of the E-block. After the stake is inserted into the hole, the stake is swaged to the hole of the actuator arm via the central channel to secure the suspension assembly to the actuator arm.

Typically, suspension assemblies are coupled to opposed surfaces of an actuator arm for alignment relative to lower and upper disc surfaces. In particular, a tubular-shaped stake of a first suspension assembly is inserted into an upper portion of the hole such that extended ends of the stake extend downwardly from a fixed end. The stake is coupled to the upper portion of the hole for alignment relative to an upper disc surface. A stake of a second suspension system is inserted into a lower portion of the hole such that extended ends of the stake extend upwardly from a fixed end. The stake is coupled to the lower portion of the hole for alignment relative to a lower disc surface. A swaging device is inserted through the central channel of stakes positioned in the hole to impart a swaging force to deform the stakes against a wall of the hole for permanently connecting suspension assemblies to actuator arms.

Fixed diameter swaging ball devices are known for deforming or pressing stakes into the hole of the actuator arm to connect the suspension assemblies. The diameter of the ball is sized larger than the diameter of the channel to impart a swaging force to the stakes. The swaging ball is typically inserted in a single direction to swage both stakes position in upper and lower portions of the hole. For example, the swaging ball is initially inserted through the first stake at the upper portion of the hole. Due to the alignment of the first stake and insertion direction of the swaging ball, the swaging ball is inserted into the stake channel at the fixed end of the stake and exits at the extended end of the stake. Thus, the swaging ball supplies a tension force to the stake which may increase the preload force of the suspension assembly.

Thereafter, the swaging ball is inserted through the stake at the lower portion of the hole. Due to the alignment of the second stake and insertion direction of the swaging ball, the swaging ball is inserted into the stake channel at the extended end of the stake and advanced along the channel to exit at the fixed end of the stake. Thus the swaging ball supplies a compressive force to the stake which may decrease the preload force of the suspension assembly. Thus, as described, different preload characteristics are introduced by known fixed-diameter swaging devices to suspension assemblies aligned with upper and lower disc surfaces.

The stressing forces described influence the flying characteristics of the slider and have a greater impact or influence on the fly characteristics of smaller and lighter suspension assemblies which require less preload force in the flexure to fly at a correct height. Since the first and second suspension assemblies have different preloads supplied during assembly, each has different fly characteristics. It is desirable to reduce variations in preload characteristics introduced during assembly so that consistent fly characteristics may be provided for each data head for operation of the disc drive. The present invention provides a solution to this and other problems, and offers other advantages over the prior art.

SUMMARY OF THE INVENTION

The present invention relates to a swaging device for connecting suspension assemblies to actuator arms of a disc drive. Suspension assemblies may be coupled to actuator arms by tubular stakes extending from a mounting plate of the suspension assembly. The tubular stake is inserted into a hole extending into the actuator arm. The tubular stake is swaged by a swaging device to secure the tubular stake within the hole.

The swaging device of the present invention includes an expandable member which is expandable between an insertion dimension and a swaging dimension. In the insertion dimension, the expandable member is sized for insertion into a channel of a tubular stake. The expandable member is expanded to the swaging dimension to impart a swaging force to the tubular stake to swage the tubular stake relative to the hole of the actuator arm. Features and advantages which characterize the present invention will be apparent upon reading of the following detailed description and review of the associated drawings.

BRIEF DESCRIPTION OF THE DRAWINGS

It should be noted that the drawings are not to scale and that certain features have been exaggerated for clarity.

DETAILED DESCRIPTION OF THE PREFERRED EMBODIMENTS

Figure 1:
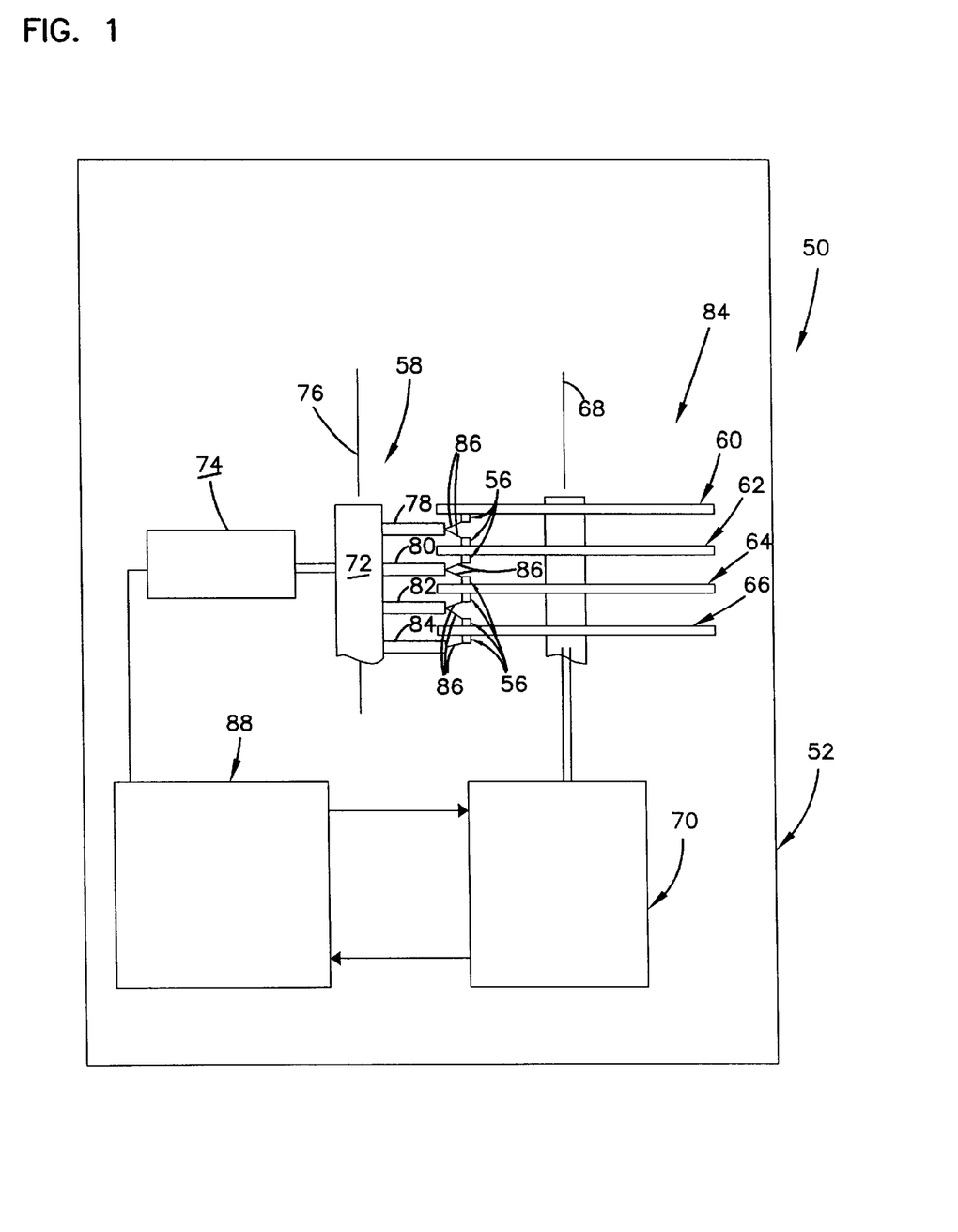
FIG. 1 is a schematic view of a disc drive.

FIG. 1 is a schematic view illustrating a disc drive 50. As shown, disc drive 50 includes a housing 52 (shown schematically), disc stack 54, and a plurality of head gimbal assemblies (HGA) 56, which are supported relative to disc stack 54 and actuated by actuator assembly 58. Disc stack 54 includes a plurality of discs 60, 62, 64, and 66 supported for co-rotation about spindle axis 68 by a spindle motor 70. The head gimbal assemblies 56 support a disc head slider via a gimbal spring (not shown) for reading information from and writing information to upper and lower disc surfaces in a known manner.

The actuator assembly 58 includes an actuator block 72 and actuator drive 74. Actuator block 72 is rotationally coupled to housing 52 for operation about a pivot axis 76 in a known manner. Although a rotary-type actuator is described, it should be understood that the invention is not limited to a rotary actuator system and that other actuators, such as a linear actuator, may be employed. A plurality of spaced stacked actuator arms 78, 80, 82, and 84 extend from the actuator block 72 in alignment with lower and upper disc surfaces of discs 60, 62, 64, and 66. The HGAs 56 are coupled to actuator arms 78, 80, 82, and 84 via load beams 86.

As shown, a first actuator arm, such as actuator arm 78, supports HGA 56 in alignment with an upper disc surface of disc 62, and an adjacent actuator arm, such as actuator arm 80, supports HGA 56 in alignment with a lower disc surface of disc 62. Actuator drive 74, which is typically a voice coil motor, pivots actuator block 72 about the pivot axis 76 for alignment with selected data tracks of discs 60, 62, 64, and 66. Operation of the spindle motor 70 and actuator drive 74 are controlled via control circuitry 88 of disc drive 50. Although the disc stack 54 shown includes four (4) discs, it should be understood that the disc stack 54 may include any number of discs, and the disc drive is not limited to the specific embodiment described.

Figure 2:
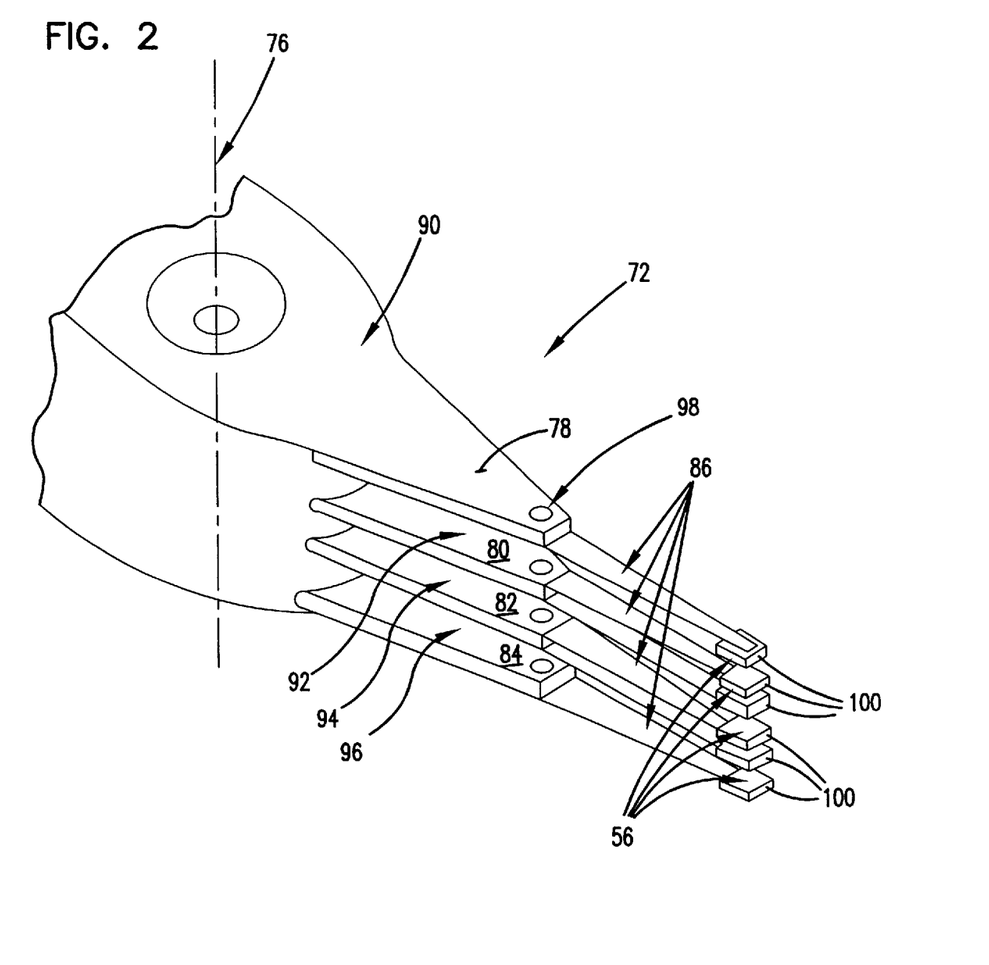
FIG. 2 is a perspective view of an "E-Block" for supporting data heads for reading information from and writing information to selected data tracks.

FIG. 2 illustrates the actuator block 72 for supporting HGAs 56. The actuator block 72 is rotationally coupled to housing 52, as previously described, and includes a main portion 90 supporting the plurality of actuator arms 78, 80, 82, and 84, which are typically integrally formed with the main portion 90 and extend from main portion 90 to define an "E-block" shaped structure. The actuator arms 78, 80, 82, and 84 are supported in a spaced relation to define gaps 92, 94, and 96 therebetween, respectively. The actuator arms 78, 80, 82, and 84 include a mounting hole 98. As previously explained, the HGAs 56 are coupled to load beam 86 and are supported thereby. The load beam 86 and HGA 56 define a suspension assembly. The HGAs 56 include a slider 100 carrying transducers (not shown) for reading data from and writing data to discs. Suspension assemblies are coupled to the actuator arms 78, 80, 82, and 84 for flexibly supporting sliders 100.

Figure 3:
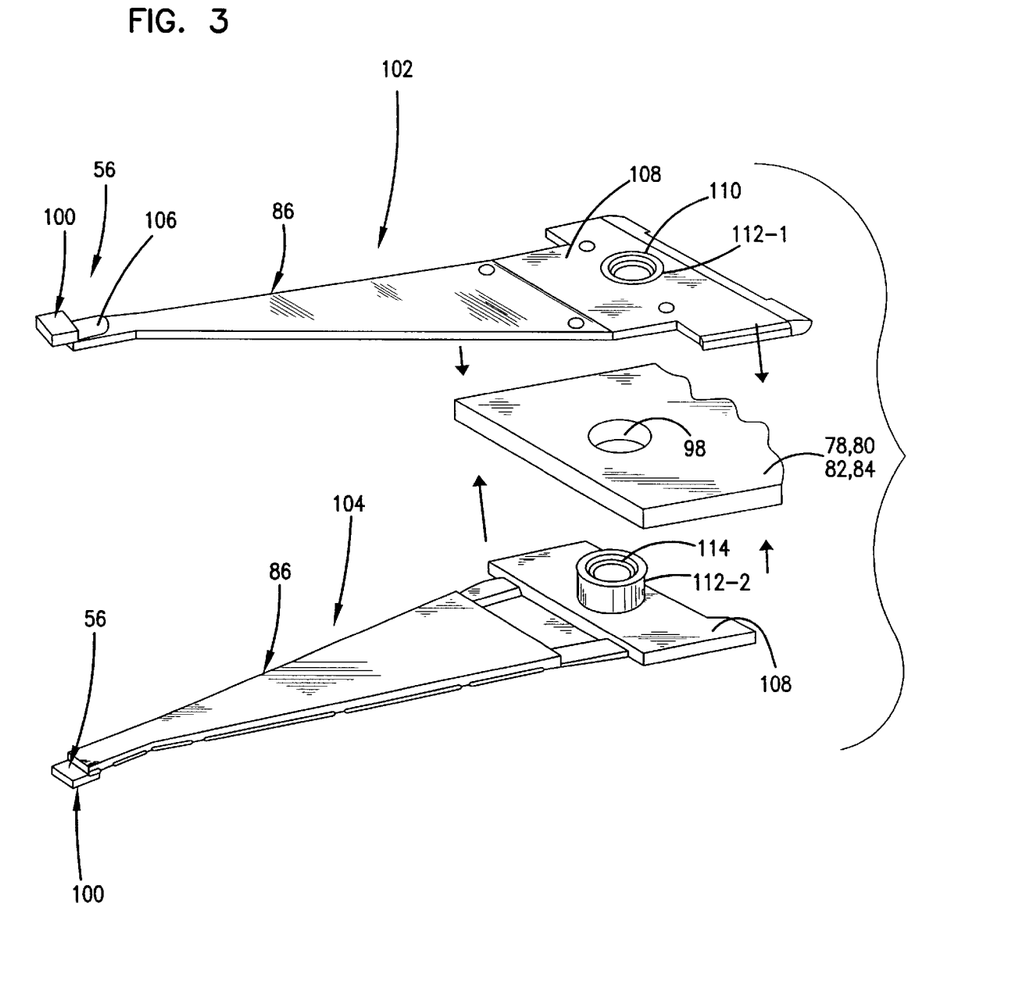
FIG. 3 is an exploded view of suspension assemblies coupled to an actuator arm of an "E-Block".

FIG. 3 is an exploded view illustrating assembly of first and second suspension assemblies 102, 104 to an actuator arm to support suspension assemblies 102, 104 for operation. Sliders 100 of HGAs 56 are supported relative to the load beam via a gimbal spring 106 in a known manner. As shown, suspension assemblies 102, 104 include a mounting plate 108 which is generally fixedly coupled to an elongated flexible portion defining the load beam 86 in a known manner. Mounting plate 108 includes a mounting opening 110. Tubular shaped stakes 112 having a central opened channel 114 extends from mounting plate 108 with channel 114 in alignment with mounting opening 110. Stakes 112 may be separately or integrally formed with mounting plate 108. In particular, a fixed end of stake 112 is coupled to mounting plate 108 and an extended end of stake 112 is spaced from mounting plate 108. Preferably, the diameter of the mounting opening 110 is similar to the diameter of channel 114 to define an opened single diameter channel extending through mounting plate 108 and stake 112.

The outer circumference of the tubular stake 112 is sized for insertion into hole 98 of actuator arms 78, 80, 82, and 84. As shown in FIG. 3, the first suspension assembly 102 is aligned to position slider 100 upwardly and stake 112 (i.e. extended end) extends downwardly for insertion into the upper portion of hole 98 to define an upper stake 112-1 for supporting the head (slider 100) to read information from and write information to a lower disc surface. The second suspension assembly 104 is aligned to position slider 100 downwardly and stake 112 (i.e. extended ends) upwardly for insertion into the lower portion of hole 98 to define a lower stake 112-2 for supporting the head to read information from and write information to an upper disc surface.

The length of stakes 112-1, 112-2 is designed for partial insertion into mounting hole 98 such that there is a gap between extended ends of inserted stakes 112-1 and 112-2. Stakes 112-1 and 112-2 are formed of a malleable material, such as metal, and after stakes 112-1 and 112-2 are inserted into hole 98, stakes 112-1 and 112-2 are deformed (i.e. essentially at extended ends) by a swaging technique to secure stakes 112-1 and 112-2 to actuator arms 78, 80, 82, and 84. As shown, depending upon the arrangement of the actuator arms and discs, not all actuator arms include first and second suspension assemblies. For example, actuator arm 84 supports a suspension assembly for alignment with a lower surface of disc 66 via stake 112-1 and does not support a second suspension assembly.

Figure 4:
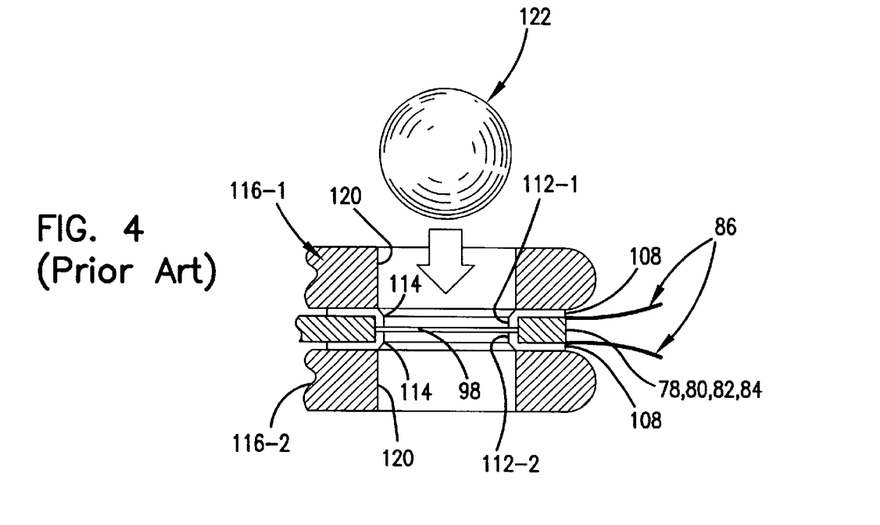
FIG. 4 is a plan view illustrating swaging of suspension assemblies to an actuator arm using a swaging ball of the prior art.

FIG. 4 illustrates a swaging technique of the prior art for securing stakes 112-1 and 112-2 to actuator arms 78, 80, 82, and 84. A support fixture (not shown) is used to support the "E"-block 72 for swaging stakes 112 to actuator arms 78, 80, 82, and 84. Spacers 116-1, 116-2, which are sized for insertion into gaps 92, 94, and 96, are inserted into gaps 92, 94, and 96, to support suspension assemblies 102, 104 relative to actuator arms 78, 80, 82, and 84. Spacers 116-1, 116-2 include holes 120, preferably sized similar to channel 114. As previously explained, stakes 112-1 and 112-2 are inserted into holes 98 of actuator arms and spacers 116-1 and 116-2, and are positioned in gaps 92, 94, 96 between adjacent actuator arms 78, 80, 82, and 84. Thereafter, a fixed diameter swaging ball 122 is forced through the holes 120 in spacers 116-1, 116-2, through channel 114 and hole 98 to deform or swage stakes 112 relative to an actuator arm.

The round shape of the swaging ball 122 defines a smaller dimensioned leading portion for facilitating insertion of swaging ball 122 through channel 114 and a larger dimensioned portion sized to provide sufficient force to the tubular stakes 112 to force the tubular stakes 112 against walls of hole 98 of the actuator arm. The swaging ball 122 is inserted in a single direction and progressively advanced to sequential actuator arms to swage suspension assemblies to multiple actuator arms of an E-block. In particular, the swaging ball 122 may be forced through multiple spacers 116-1, 116-2 positioned between gaps 92, 94, 96 and may be progressively positioned relative to extended ends of stakes 112-1, 112-2 to secure multiple suspension assemblies to multiple actuator arms of an E-block.

Figure 5:
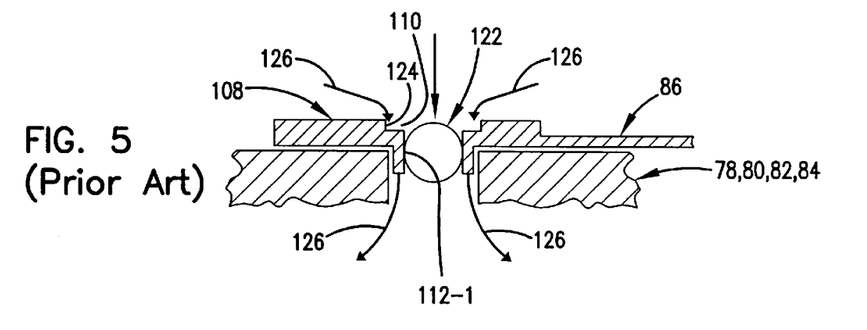
FIG. 5 is a detailed view illustrating the swaging ball of the prior art being inserted into an upper stake of a suspension assembly.
Figure 6:
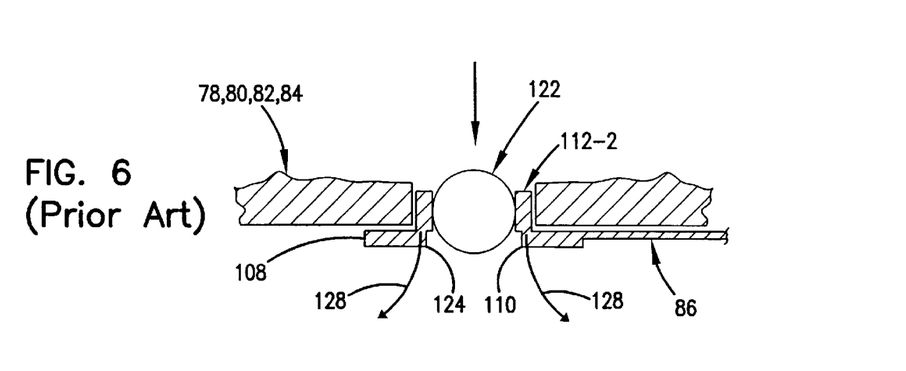
FIG. 6 is a detailed view illustrating the swaging ball of the prior art being inserted into a lower stake of a suspension assembly.

As previously explained, it is important that first and second suspension assemblies are assembled to actuator arms so that the first and second suspension assemblies have consistent preload forces for consistent fly characteristics. As shown in FIGS. 5 and 6, the swaging ball 122 is inserted through first and second stakes 112-1 and 112-2 in a single insertion direction. As the swaging ball 122 is inserted through channel 114 of stake 112-1 from the fixed end of the stake 112-1 at mounting opening 110 to the extended end, the swaging ball 122 essentially supplies a tension force to stake 112-1, as illustrated by arrows 126. This tension force influences the preload characteristics of the suspension assembly 102 (essentially increases the preload force). It is noted that stake 112-1 includes notch 124 at mounting opening 110 to facilitate insertion of ball 122.

As shown in FIG. 6, the swaging ball 122 is further advanced into and through stake 112-2 from the extended end of stake 112-2 to the fixed end of stake 112-2 at mounting opening 110. Since the swaging ball 122 is forced through extended ends to the fixed end, a compressive force, as illustrated by arrow 128, is supplied to stake 112-2 to provide an opposite influence to the load characteristics of suspension assembly 104 from the tension force supplied to stake 112-1. In particular, since stakes 112-1 and 112-2 are inserted into hole 98 in opposed relation with extended ends extending towards one another and the swaging ball 122 is inserted in a single direction to swage stakes 112-1 and 112-2, the swaging ball supplies different preload characteristics to suspension assemblies 102, 104, thus affecting the fly characteristics of the slider 100 of each suspension assembly 102, 104.

Figures 7, 8:
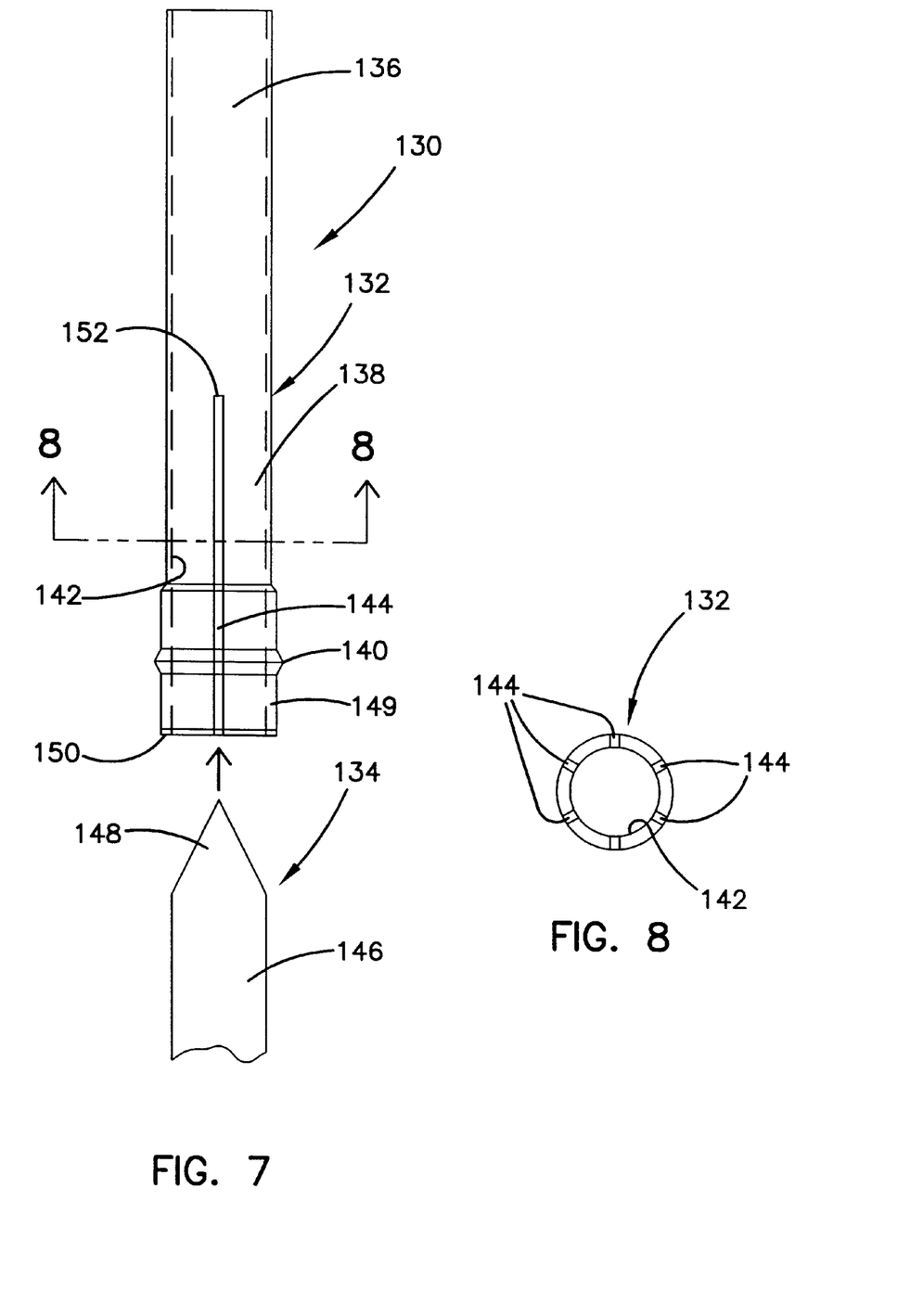
FIG. 7 is a plan view of an embodiment of the swaging assembly of the present invention including an expandable swaging device and actuating device.
FIG. 8 is a cross-sectional view taken along line 8—8 of FIG. 7.

FIGS. 7–8 illustrate an embodiment of a swaging assembly 130 of the present invention for connecting suspension assemblies 102, 104 to actuator arms. FIG. 7 is a plan view and FIG. 8 is a cross-sectional view taken along lines 8—8 of FIG. 7. As shown, the swaging assembly 130 includes an expandable swaging device 132 and an actuating device 134. The expandable swaging device 132 includes a shaft 136, an expandable extent 138, and a swaging ridge 140 positioned along the expandable extent 138 and expandable therewith. The expandable extent 138 is preferably formed a hollow cylindrical member defining a central channel 142 and preferably includes a plurality of circumferentially-spaced slits 144 (only one shown in FIG. 7 for clarity) extending therealong between the outer surface and channel 142, as illustrated in FIG. 8. The slits allow for expansion of the expandable extent 138 between an insertion diameter (shown) and a swaging diameter (not shown).

In the embodiment shown, the actuating device 134 is formed of an elongated rod member 146 having a conically-shaped tip 148. The diameter of the actuating device 134 is sized so that the actuating device 134 is inserted into channel 142 along the expandable extent to expand extent 138 to a swaging diameter. The conical-shaped tip 148 facilitates insertion of the actuating device 134 into channel 142 of the swaging device 132. It should be understood that alternately shaped and designed swaging members and actuating members may be used and the invention is not limited to the exact configuration shown.

The expandable extent 138 is sized for insertion through channels 114 of stakes 112 for swaging stakes 112 to actuator arms. In particular, the expandable extent 138 includes a collar segment 149 extending along a portion of the expandable extent 138. The collar segment 149 has a slightly larger diameter than the remaining expandable extent 138 and shaft 136. The swaging ridge 140 extends from the collar segment 149. The insertion diameter of the collar segment 149 (and expandable extent 138 and shaft 136) is sized smaller than channel 114 of stake 112. Preferably, the swaging ridge 140 extending about collar segment 149, which forms a swaging portion, has a slightly larger insertion diameter than the channel 114 to provide a slight force to the walls of the stakes 112 during insertion. For example, if the diameter of the channel 114 is approximately 0.084 inches (2.134 millimeters), the collar segment of expandable extent 138 is 0.08 inches (2.032 millimeters) and the diameter of the swaging ridge 140 is 0.90 inches (22.86 millimeters). However, it should be understood that the swaging ridge 140 may be dimensioned smaller than channel 114.

In the embodiment illustrated above, rod member 146 and tip 148 of the actuating device 134 are sized smaller than channel 114 for insertion through channels 114 and mounting holes 98 for alignment and insertion into channel 142 of swaging device 134. The dimension of the rod member 146 is sized to expand swaging device 132 along expandable extent 138 when inserted into channel 142. For example, the diameter of rod 146 is approximately 0.072 inches (1.83 millimeters). As previously explained, the diameter of stake channel 114 is approximately 0.084 inches (2.134 millimeters) and thus rod 146 may be easily maneuvered relative to various actuator arms through stake channels 114 and hole 98 without applying force thereto. The diameter of channel 142 is approximately 0.06 inches (1.52 millimeters) and thus insertion of rod 146 into channel 142 expands swaging device 132 to provide sufficient swaging force to stakes 112. Thus, no swaging force is supplied by the rod 146 until rod 146 is inserted into swaging device 132, positioned relative to extended ends of stakes 112. Preferably, the swaging diameter of the swaging ridge 140 in the embodiment described is 0.10 inches (2.54 millimeters).

Slits 144 extend from an insertion end 150 of the swaging device 132 to a fulcrum position 152 distal of swaging ridge 140. The distance between insertion end 150 and fulcrum 152 defines the expandable extent 138. The swaging ridge 140 is positioned distal of the insertion end 150 into which actuating device 134 is inserted for expansion. The distance between insertion end 150 and swaging ridge 140 is designed to provide sufficient swaging force (via expansion of expandable extent 138 at swaging ridge 140) to stakes 112-1 and 112-2 via insertion of actuating rod 146 into insertion end 150 of swaging device 134.

For example, in a preferred embodiment, the length of slits 144 from end 150 to fulcrum 152 is 0.25 inches (6.35 millimeters), and the swaging ridge 140 is positioned approximately 0.055 inches (1.4 millimeters) from end 150 for sufficient expansion for providing sufficient swaging force. Preferably, as shown in FIG. 8, slits 144 are equally spaced about a circumference of expandable extent 138. Also, in a preferred embodiment, at least six (6) slits 144 are included. It is noted that not all slits 144 are shown in FIG. 7 for clarity. Preferably, insertion end 150 is tapered to facilitate insertion of device 132 through stakes 112. Shaft 136 is preferably a hollow member integrally formed with extent 138 and has a similar dimension to the expandable extent 138.

Figure 9:
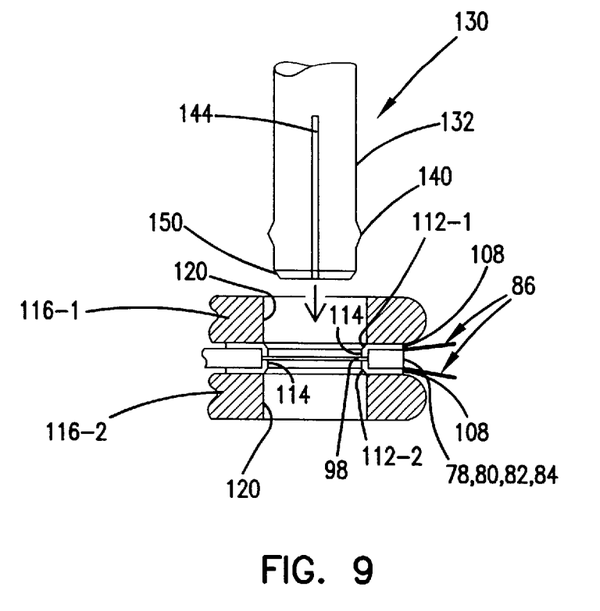
FIGS. 9–11 are illustrative views illustrating operation of an embodiment of the swaging assembly of present invention.
Figure 10:
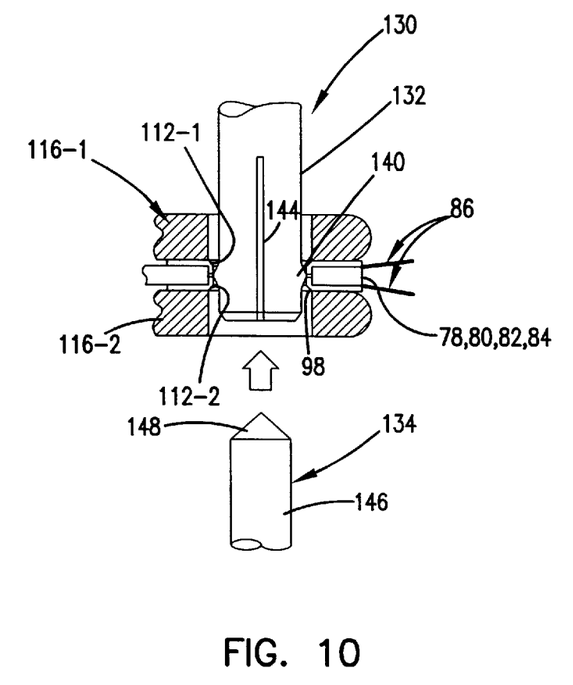
Figure 11:
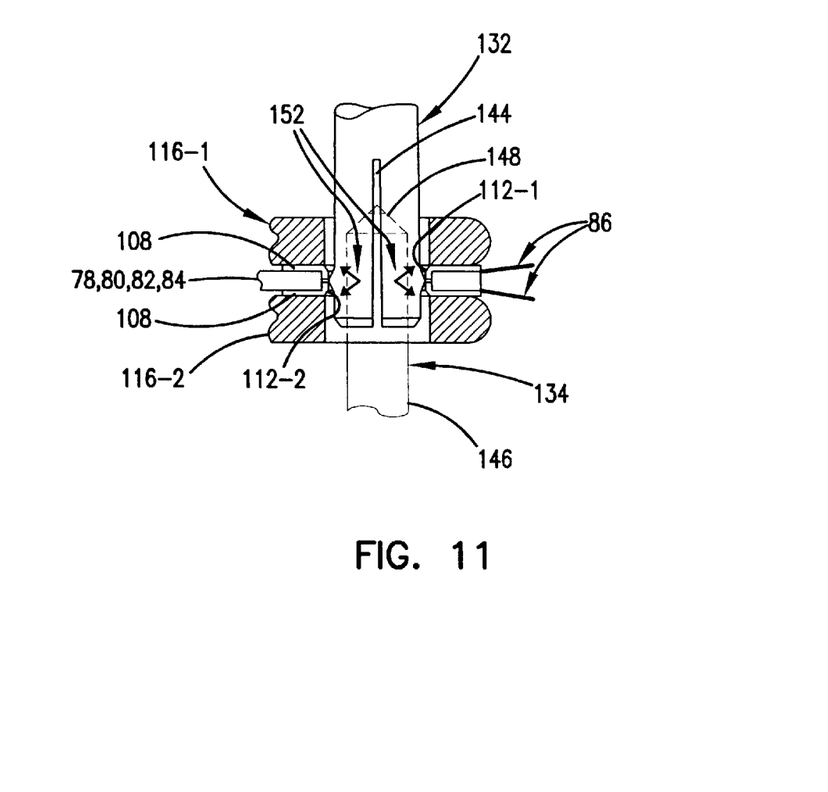

FIGS. 9–11 illustrate use of the swaging assembly 130 for swaging stakes 112 to actuator arms 78, 80, 82 and 84, illustrated for a single actuator arm. As shown, first and second stakes 112-1 and 112-2 are inserted through hole 98. As shown in FIG. 9, the length of the swaging ridge 140 is sufficient so that swaging ridge 140 may be simultaneously aligned within channels 114 of both first and second stakes 112-1 and 112-2 coupled to a single actuator arm 78, 80, 82, 84 so that swaging ridge 140 supplies an expansion force to both first and second stakes 112-1 and 112-2 simultaneously in a single position. In an example embodiment, the length of the swaging ridge is 0.028 inches (0.71 millimeters). Preferably, as shown, swaging ridge 140 is a "V"-shaped notch extension. The tip of the "V"-shaped notch essentially aligns between a gap between first and second stakes 112-1 and 112-2 inserted into actuator arm 78, 80, 82, 84, and the sloped sides of the "V"-shaped notch are aligned to supply a generally radially-directed swaging force to stakes 112-1 and 112-2.

Prior to a swaging operation, spacers 116-1, 116-2 are positioned between adjacent actuator arms. End 150 of the swaging device 132 is inserted in a first direction through opening 120 of spacers 116-1 and 116-2 and into channels 114 of stakes 112 to align swaging ridge 140 with stakes 112-1, 112-2. As the swaging device 132 is inserted, swaging ridge 140 provides a slight compressive force to the stakes 112 toward wall of hole 98. Since the remainder of the swaging device 132 is profiled smaller than stake channels 114, no other significant forces are supplied to the stakes during insertion of the swaging device 132.

As illustrated in FIGS. 10–11, after device 132 is positioned, the actuating device 134 is inserted into channels 114 in a second direction, opposite of the first insertion direction. To operate swaging device 132 as shown in FIG. 11, actuating rod 146 is inserted through insertion end 150 for expanding extent 138 and swaging ridge 140. As previously explained, insertion of devices 132 and 134 does not supply a significant force to stakes 112-1 and 112-2. Force is not applied during insertion, but after the swaging ridge 140 is aligned and actuating device 134 (i.e., rod 146) is inserted into channel 142 so that a generally radially-directed uniform force is supplied to both stakes 112-1 and 112-2 via symmetric ridge 140, as illustrated by arrows 152 in FIG. 11. The uniform radially-directed force to stakes 112-1 and 112-2 reduces differences in preload characteristics for the first and second stakes 112-1, 112-2.

Figure 12:
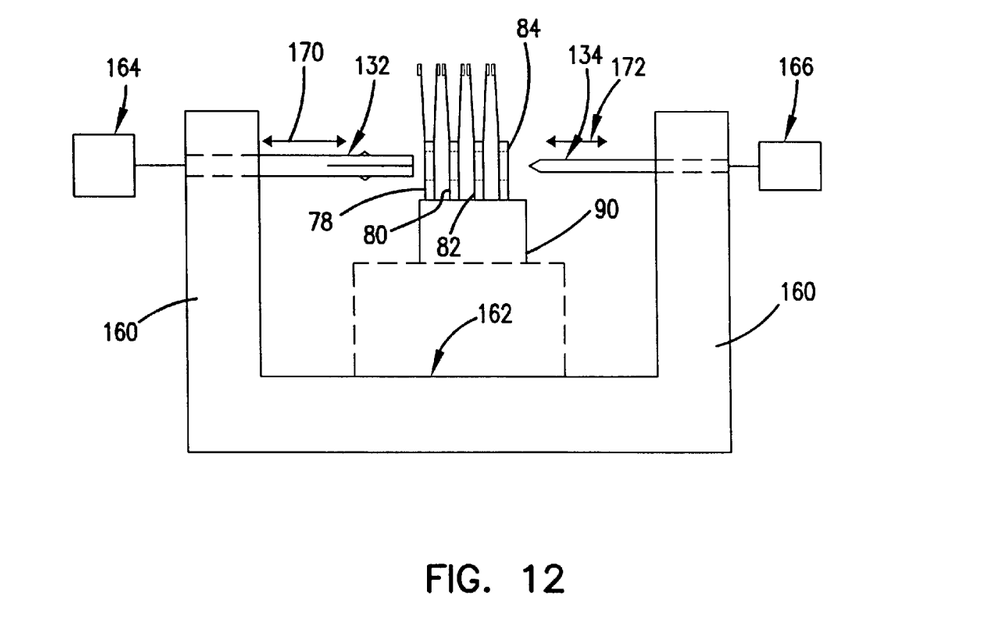
FIG. 12 is an illustrative view of an operating device for an embodiment of the swaging assembly.

Although use of an embodiment of the swaging assembly is illustrated for swaging suspension assemblies to a single actuator arm, the swaging assembly 130 may be used to swage suspension assemblies to sequential actuator arms on an E-block having any number of actuator arms, for multi-disc drives. FIG. 12 is a schematic illustration of use of a fixture for swaging suspension assemblies to multiple actuator arms of an E-block. As shown in FIG. 12, swaging device 132 and actuating device 134 are supported by spaced posts 160 supported by base 162. Positioning devices 164, 166 are coupled to swaging device 132 and actuating device 134 to move the devices supported in spaced relation via posts 160 toward and away from one another, as illustrated by arrows 170, 172. An E-block (shown diagrammatically) may be supported by a platform (shown diagrammatically) supported by base 162. The E-block is supported so that holes 98 of actuator arms (having stakes 112-1, 112-2 inserted therein) align with the supported swaging device 132 and actuating device 134 for insertion therethrough. Positioning devices 164, 166 may be a mechanical screw or, alternatively, may be a pneumatic system or any other known system.

For operation, spacers 116-1, 116-2 (not shown for clarity) are positioned between adjacent actuator arms of an E-block. The swaging device 132 and actuating device 134 are operating via positioning devices 164, 166. As previously explained, to swage stakes to actuator arm 78, positioning device 164 first aligns swaging ridge 140 (within channel 114 of stakes), and then positioning device 166 aligns actuating device 134 for insertion through channel 142 of swaging device 132 for swaging stakes to actuator arm. Thereafter, positioning device 166 is operated to withdraw actuating device 134 from channel 142 so that swaging device 132 may be advanced and aligned with stakes inserted through actuator arm 80 for similarly actuating stakes to arm 80. This process is repeated until the desired stakes are swaged to each actuator arm. Thereafter, devices 132, 134 are completely retracted so that the E-block can be removed.

Figure 13:
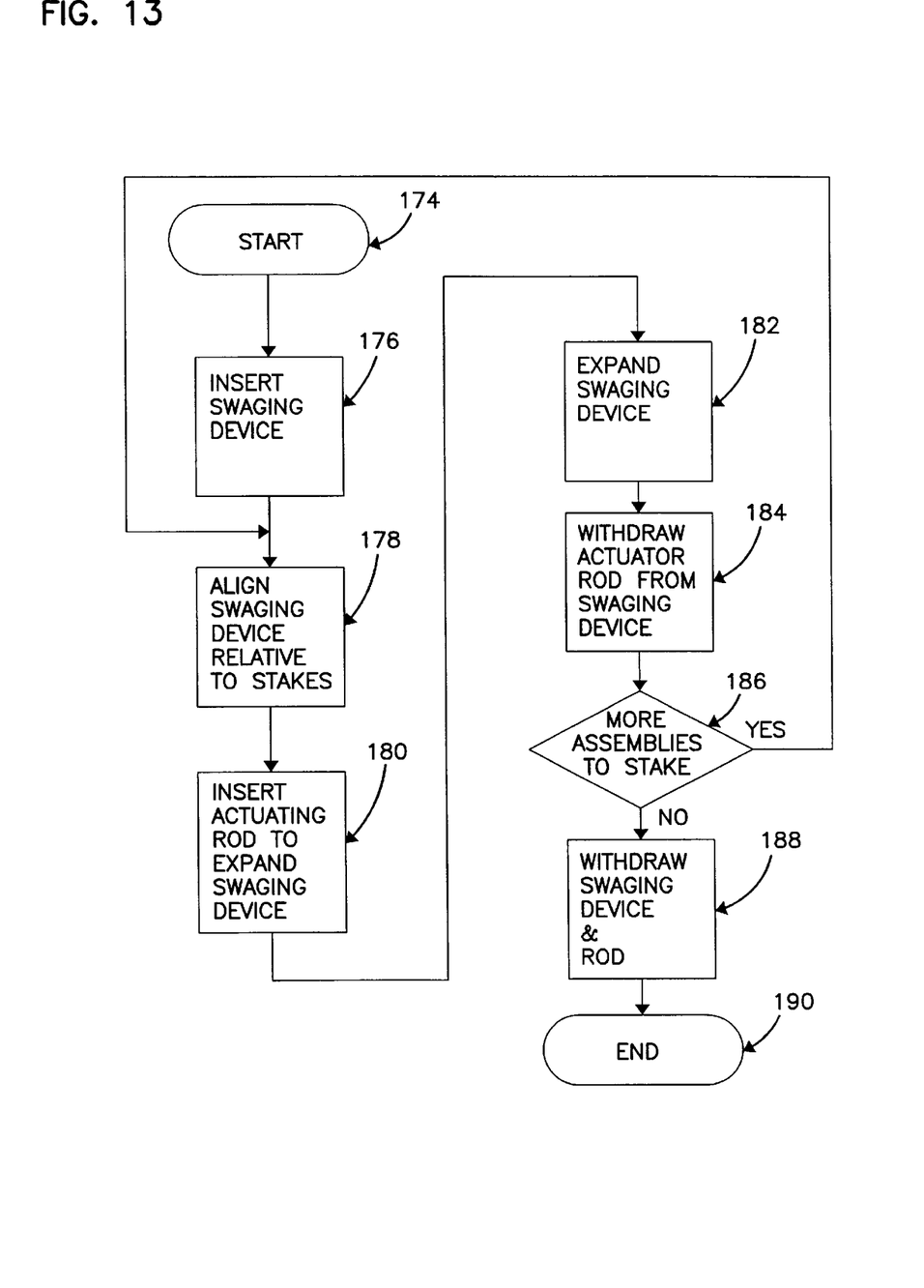
FIG. 13 is a flow chart illustrating steps of operation for use of an embodiment of a swaging device to swage suspension assemblies to multiple actuator arms.

FIG. 13 is a flow chart illustrating steps of use of an embodiment of a swaging device for connecting suspension assemblies to actuator arms of an E-block. The swaging operation starts as illustrated by block 174; and the swaging device 132 is inserted into hole 98 of actuator arm 78, as illustrated by block 176. Thereafter, the swaging device 132 is aligned relative to stakes 112 of a first actuator arm 78, as illustrated by block 178. Actuating rod 146 is inserted through holes 98 of actuator arms (i.e., opposite to swaging device 132), as illustrated by block 180. The rod 146 is advanced for insertion through channel 142 of swaging device 132 to expand swaging device 132, as illustrated by block 182. The swaging device 132 is expanded to deform stakes to the first actuator arm 78. After stakes are swaged to the first actuator arm 78, actuator rod 146 is withdrawn from channel 142 of the swaging device 132, as illustrated by block 184. The swaging process continues for each actuator arm 80, 82, 84 such that the swaging device 132 is sequentially positioned relative to stakes 112-1, 112-2 of multiple actuator arms 80, 82, 84 to secure each actuator arm 78, 80, 82, 84 to the E-block, as illustrated by block 186. After each actuator arm 78, 80, 82, 84 is staked, the swaging device 132 and rod 146 are withdrawn, as illustrated by block 188, to complete the swaging process for an E-block, as illustrated by block 190.

Figure 14:
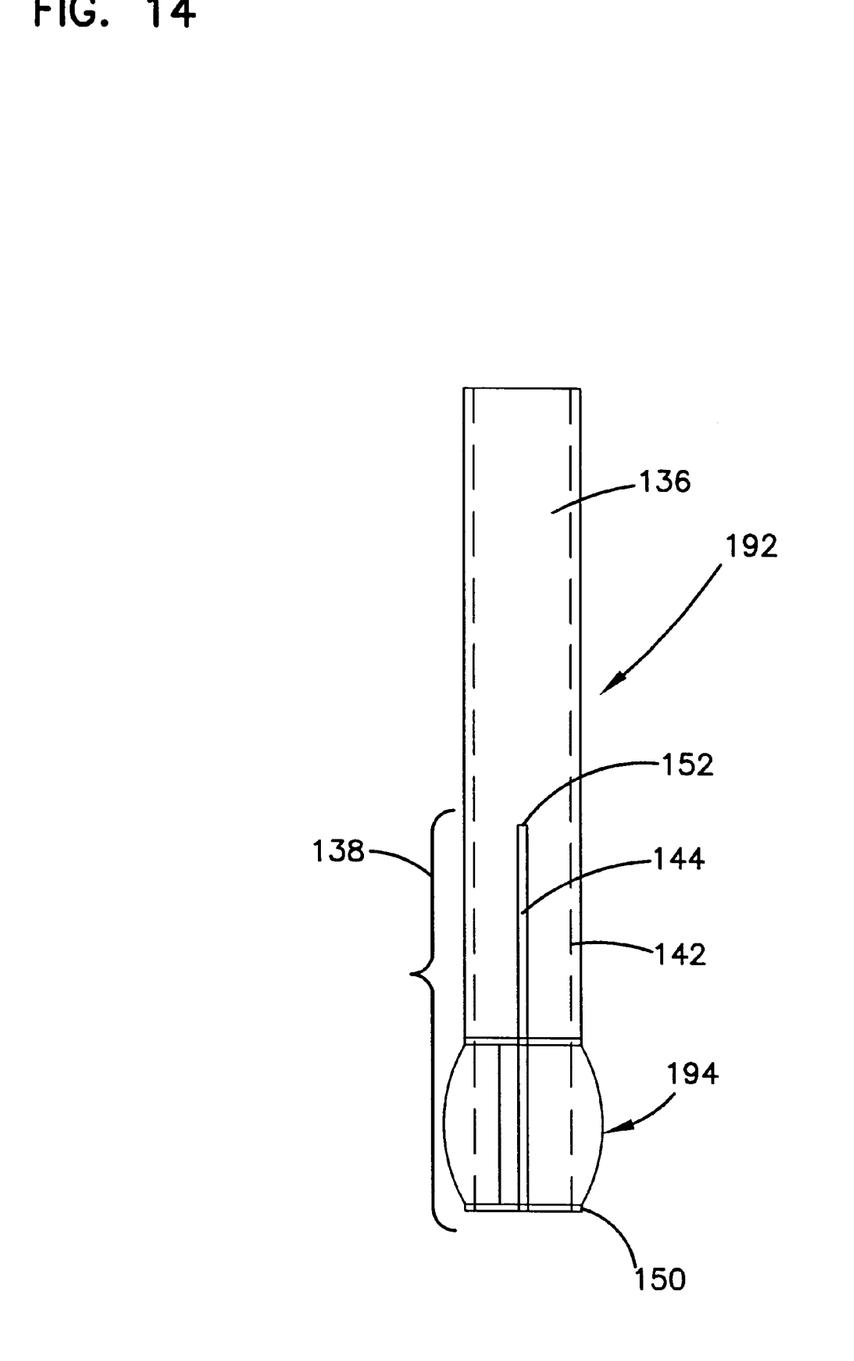
FIG. 14 is a plan view of an alternate embodiment of a swaging device according to the present invention.

FIG. 14 illustrates an alternate embodiment of an expandable swaging device 192, and like numbers are used to refer to like parts. As shown, swaging device 192 includes a dome-shaped swaging portion 194, instead of a "V" shaped swaging ridge 140. The length of the dome-shaped swaging portion 194 may be sized to extend along a greater extent of stakes 112-1, 112-2. It should be understood that the swaging portion may be formed of a variety of shapes or configurations and that the invention is not limited to the particular embodiments shown.

Figure 15:
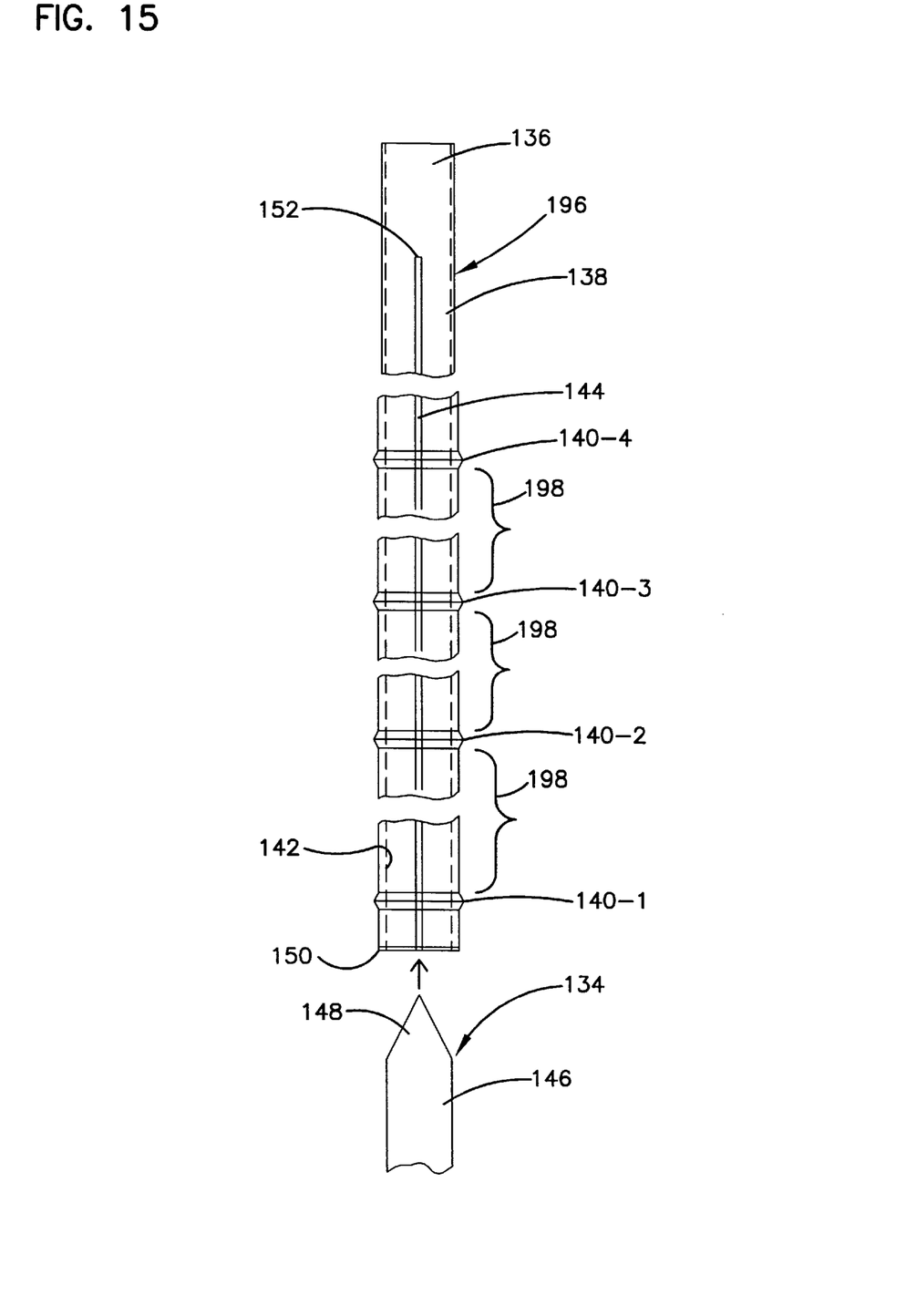
FIG. 15 is a plan view of an alternate embodiment of a swaging device according to the present invention.

FIG. 15 illustrates another alternate embodiment of an expandable swaging device 196, and like numbers are used to refer to like parts illustrated in previous embodiments. As shown, swaging device 196 includes multiple swaging ridges 140-1 through 140-4 at spaced locations to align with stakes 112 inserted into holes 98 of multiple actuator arms 78, 80, 82, 84. The ridges 140-1 through 140-4 are spaced a predefined distance 198 corresponding to the extent between stakes 112 of multiple actuator arms 78, 80, 82, 84 so that ridges 140-1 through 140-4 are simultaneously positioned relative to stakes 112 of multiple actuators arms 78, 80, 82, 84 to swage stakes 112 to multiple actuator arms 78, 80, 82, 84 via insertion of actuator rod 134.

Accordingly, various embodiments of an expandable swaging device and actuating device may be used without departing from the spirit and scope of the present invention.

Thus, as described, the swaging assembly 130 includes an expandable swaging device 132 which is expandable between an insertion dimension and a swaging dimension. In the insertion dimension, the swaging device 132 may be inserted into stake channels without supplying significant biasing forces tending to affect the flying characteristics of the data heads. Once inserted and aligned in stake channels, the swaging device is expanded to the swaging dimension to impart a swaging force to the tubular stake for connecting suspension assemblies 102, 104 to actuator arms. Preferably, the swaging device 132 is actuated by a rod-type actuating device 146 which is insertable into channel 142 of the expandable member to expand the swaging device 132 to the swaging dimension. Also, preferably, the expandable member is formed of a tubular member having at least one slit 144 extending therealong.

It is to be understood that even though numerous characteristics and advantages of the various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention.

What is claimed is:

1. A method for swaging a suspension assembly to an actuator arm of an actuator block in a disc drive comprising steps of:
   inserting a deformable tubular stake into an aperture of the actuator arm to position a channel of the deformable tubular stake within the aperture of the actuator arm;
   providing an expandable swaging member operable between a swaging dimension and an insertion dimension;
   inserting the expandable swaging member in the insertion dimension into the channel of the deformable tubular stake;
   providing an actuating rod sized for insertion into a channel of the expandable swaging member to expand the swaging member from the insertion dimension to the swaging dimension;
   inserting the actuating rod into the channel of the expandable swaging member to expand the swaging member to deform the tubular stake to swage the tubular stake relative to the actuator arm and;
   withdrawing the actuator rod from the channel of the expandable swaging member to release the expandable swaging member to the insertion dimension and removing the expandable swaging member from the channel of the deformable tubular stake.

2. The method of claim 1 wherein the expandable swaging member is inserted into the channel of the deformable tubular stake in a first direction, and the actuating rod is inserted into the channel of the expandable swaging member in a second opposite direction.

3. The method of claim 1 wherein the expandable swaging member and the actuating rod are sequentially positioned relative to a plurality of tubular stakes inserted into a plurality of apertures of a plurality of actuator arms to swage a plurality of suspension assemblies to the plurality of actuator arms.

4. The method of claim 1 wherein the actuator rod is withdrawn from the channel of the expandable swaging member prior to removing the expandable swaging member from the channel of the deformable tubular stake.

5. The method of claim 1 wherein the expandable swaging member includes a swaging portion along the length thereof and further comprising the step of:
   aligning the swaging portion relative to the deformable tubular stake prior to inserting the actuator rod to expand the swaging member.

6. The method of claim 1 wherein the actuator block includes a plurality of actuator arms to support a plurality of suspension assemblies and the expandable swaging member includes a plurality of swaging portions along a length thereof comprising the step of:
   aligning the plurality of swaging portions on the expandable swaging member relative to a plurality of deformable tubular stakes inserted into a plurality of apertures of the plurality of actuator arms prior to inserting the actuator rod.

7. A method for swaging suspension assemblies to a plurality of actuator arms of an actuator block comprising the steps of:
   inserting a plurality of deformable tubular stakes into a plurality of apertures of the plurality of actuator arms of the actuator block;

inserting an expandable swaging member into one of the plurality of tubular stakes of the plurality of actuator arms of the actuator block;

expanding the swaging member from an insertion dimension to an expanded dimension to deform the one of the plurality of tubular stakes to swage the one of the plurality of tubular stakes; and moving the expandable swaging member to insert the expandable swaging member into a second of the plurality of tubular stakes.

8. The method of claim 7 wherein the step of expanding the swaging member comprises the step of inserting an actuator rod into a channel of the expandable swaging member to insert the expandable swaging member into the second of the plurality of tubular stakes.

9. A method for swaging a suspension assembly to an actuator arm of a data storage device comprising:

inserting a deformable tubular stake into an aperture of the actuator arm to position a channel of the deformable tubular stake within the aperture of the actuator arm;

inserting an expandable swaging member into the channel of the deformable tubular stake;

expanding the inserted expandable swaging member from an insertion dimension to an expanded swaging dimension to swage the deformable tubular stake relative to the actuator arm; and removing the expandable swaging member form the deformable tubular stake swaged relative to the actuator arm.

10. The method of claim 9 wherein the expandable swaging member includes at least one slit along a length portion thereof and the step of expanding the expandable swaging member comprises:

opening the at least one slit to expand a dimension of the expandable swaging member.

11. The method of claim 10 wherein the step of opening the at least one slit comprises the step of:

inserting an actuator rod into a channel of the expandable swaging member to open the at least one slit to expand the expandable swaging member.

12. The method of claim 9 and comprising the step of:

aligning the expandable swaging member proximate to a swaging position prior to expanding the expandable swaging member.

13. The method of claim 9 wherein the expandable swaging member includes a swaging portion along a length thereof and further comprising the step of:

aligning the swaging portion of the inserted expandable swaging member proximate to a swaging position prior to expanding the expandable swaging member.

14. The method of claim 9 including a plurality of actuator arms forming an actuator block and comprising the steps of:

inserting a plurality of deformable tubular stakes into a plurality of apertures of the plurality of actuator arms; and aligning the expandable swaging member relative to extended ends of the plurality of tubular stakes prior to the step of expanding the expandable swaging member to swage the plurality of tubular stakes to the plurality of actuator arms.

15. The method of claim 14 wherein the expandable swaging member includes a swaging portion and the step of aligning aligns the swaging portion relative to the extended ends of the plurality of tubular stakes prior to the step of expanding the expandable swaging member to swage the plurality of tubular stakes to the plurality of actuator arms.

16. The method of claim 14 wherein the step of aligning the expandable swaging member relative to the extended ends of the plurality of tubular stakes comprises the steps of:

aligning the expandable swaging member relative to the extended end of one of the plurality of tubular stakes;

expanding the expandable swaging member to the expanded swaging dimension to swage the one of the plurality tubular stakes; and releasing the expandable swaging member from the expanded swaging dimension and aligning the expandable swaging member relative to the extended end of a successive tubular stake of the plurality of tubular stakes.

* * * * *